Oct. 9, 1951 M. G. CROSBY 2,570,431

RADIO RECEIVING SYSTEM

Filed Feb. 1, 1945 5 Sheets-Sheet 1

INVENTOR.
MURRAY G. CROSBY.
BY
H. S. Grover
ATTORNEY.

INVENTOR.
MURRAY G. CROSBY.
BY H. S. Grover
ATTORNEY.

Oct. 9, 1951

M. G. CROSBY 2,570,431

RADIO RECEIVING SYSTEM

Filed Feb. 1, 1945

5 Sheets-Sheet 3

INVENTOR.
MURRAY G. CROSBY.
BY H. S. Grover
ATTORNEY.

Oct. 9, 1951 M. G. CROSBY 2,570,431

RADIO RECEIVING SYSTEM

Filed Feb. 1, 1945 5 Sheets-Sheet 4

INVENTOR.
MURRAY G. CROSBY.
BY H. S. Grover
ATTORNEY.

INVENTOR.
MURRAY G. CROSBY.
BY H. S. Grover
ATTORNEY.

Patented Oct. 9, 1951 2,570,431

UNITED STATES PATENT OFFICE 2,570,431

RADIO RECEIVING SYSTEM

Murray G. Crosby, Riverhead, N. Y., assignor to Radio Corporation of America, a corporation of Delaware Application February 1, 1945, Serial No. 575,658

14 Claims. (Cl. 250—20)

This invention is an improved diversity receiving system for overcoming the effects of fading.

In my copending application Serial No. 483,989, filed April 22, 1943, now U. S. Patent 2,420,868, there is described a diversity receiving system in which the strongest signal of the receiver channels is rapidly selected for use in the common output circuit, in order to prevent the possibility of more than one receiver channel contributing to the common output at one time and thus produce distortion. In the system of my copending application, supra, each channel has a rectifier therein and the rectified currents from all channels appear as a potential drop across a common resistor. The flow of rectified current in the common resistor due to the strongest signal produces a bias to reduce the responsiveness of the channels carrying the weaker signals.

The present invention provides a diversity receiving system of improved sensitivity by reducing the amount of output from each receiver to be controlled. In accordance with one aspect of the invention, I obtain an audio frequency output directly from the receiver under control of rectified intermediate frequency signal energy. In this way I am able to separate the direct current controlling bias from the output voltages to be combined. This feature of the present invention enables a reduction in the level of the voltages to be combined, as a result of which there is an improvement in the sensitivity of the selecting action. In accordance with another aspect of the invention, I separate the intermediate frequency signal current from the direct current bias, and pass them over separate paths before superimposing them on one another. I am thus able to superimpose the intermediate frequency current on the direct current at a reduced level of intermediate frequency current. Separation is thus achieved between the alternating current signal voltages to be combined and the controlling or rectified direct current controlling voltage. This separation is accomplished with simplicity and a minimum of circuit elements.

A more detailed description of the invention follows in conjunction with drawings, wherein:

Figs. 1 to 5, inclusive, illustrate five different diversity receiving system embodiments of the invention.

Figure 1:
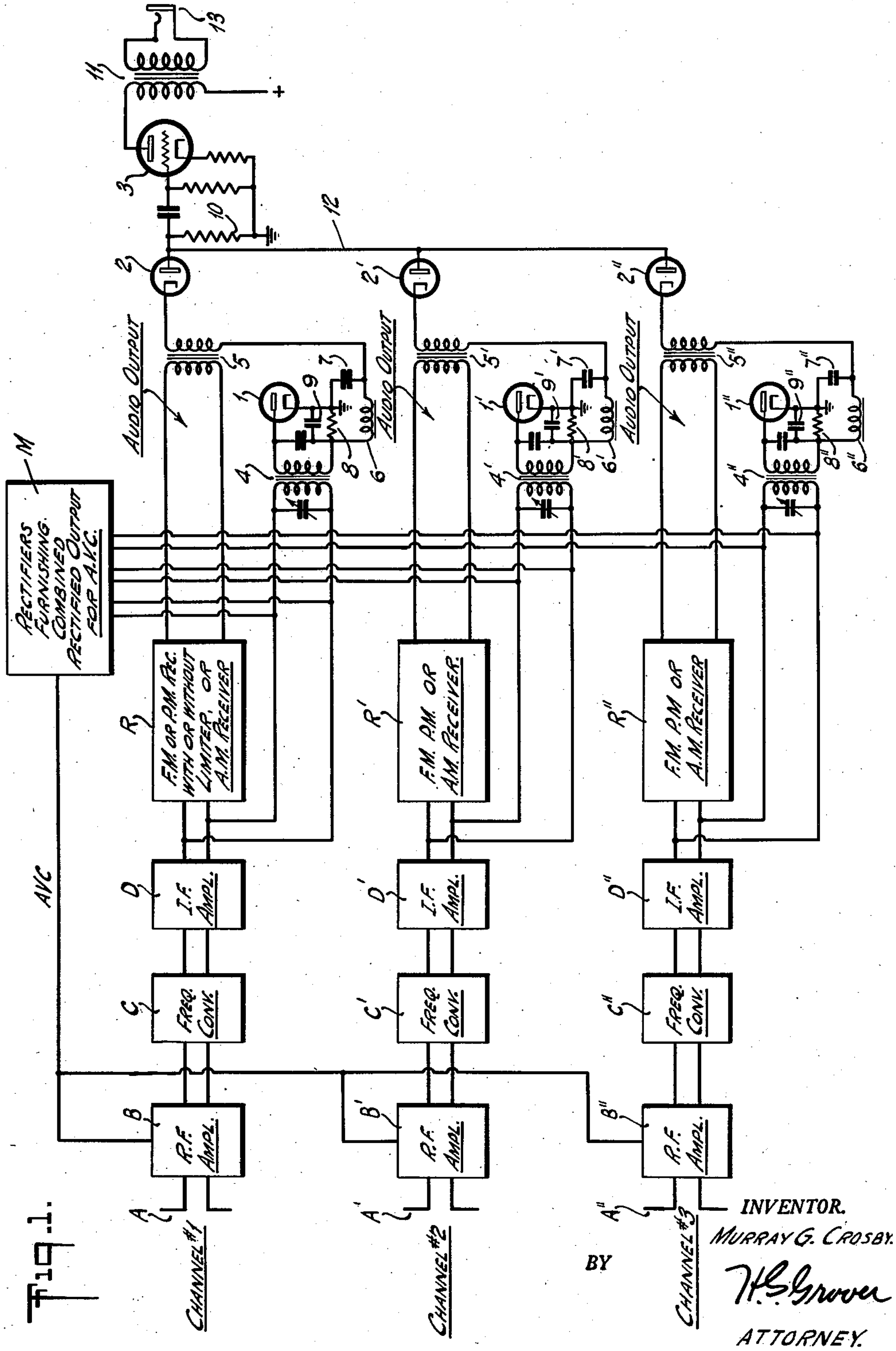

In the system of Fig. 1, the audio frequency outputs from the different channels are combined and are under control of the intermediate frequency rectified signal.

Figure 2:
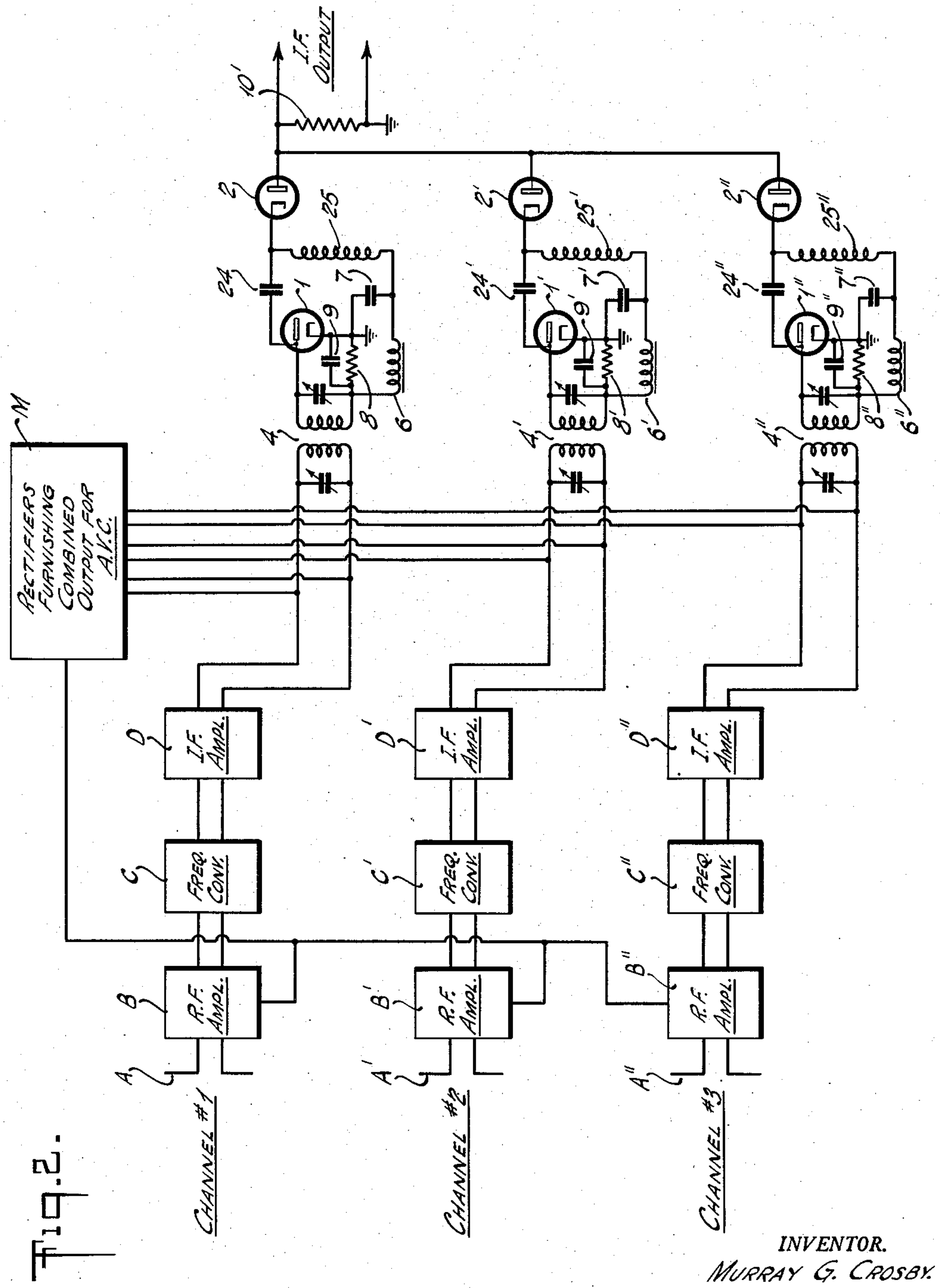

In the system of Fig. 2, the intermediate frequency outputs from the different channels are combined under control of the intermediate frequency rectified signal.

Figure 3:
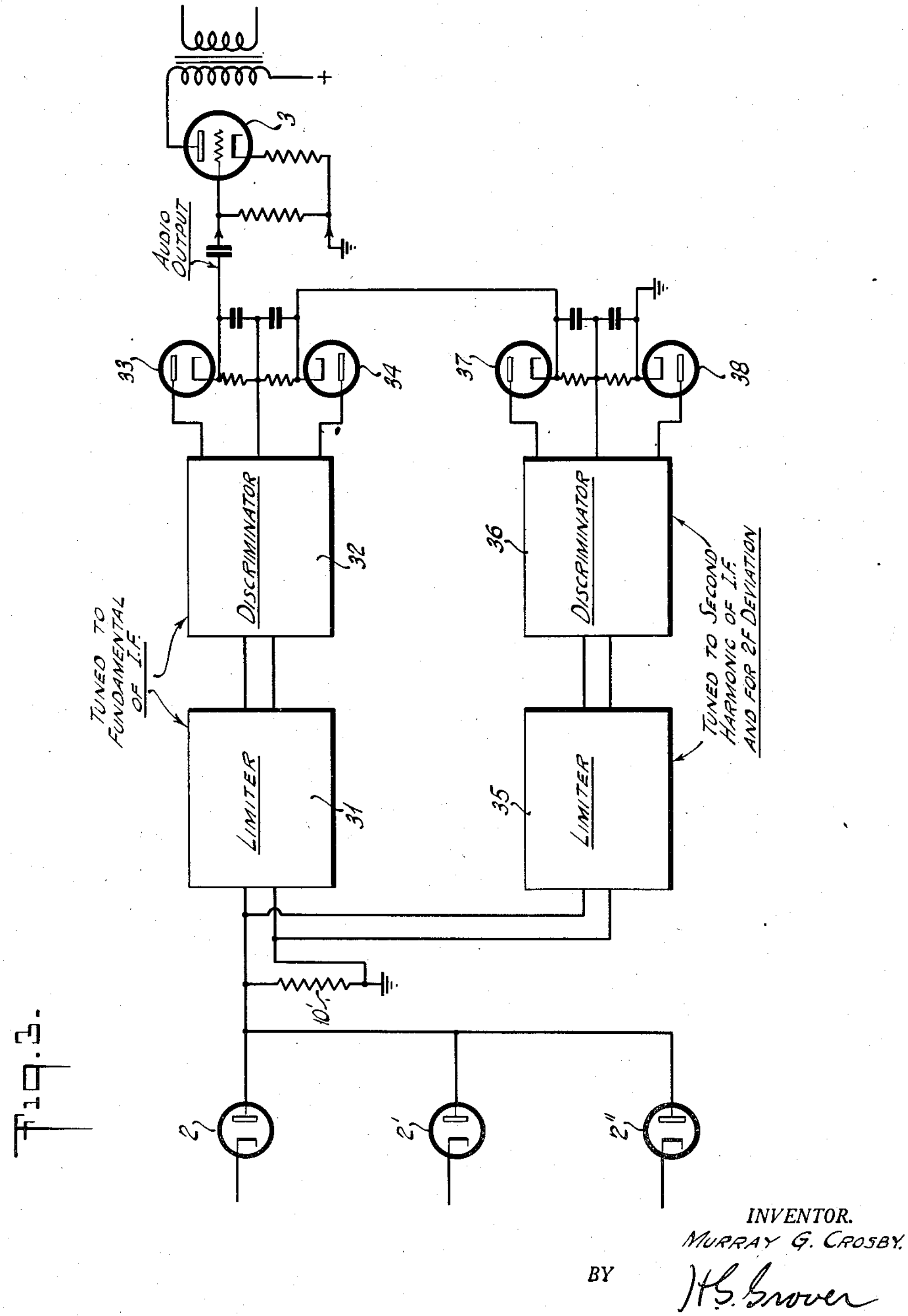

Fig. 3 illustrates a modification of the system of Fig. 2, useful for receiving phase or frequency modulated signals especially desirable for preventing cancellation of the outputs of the receivers normally brought about by equal signals of opposite phase in two or more channels.

Figure 4:
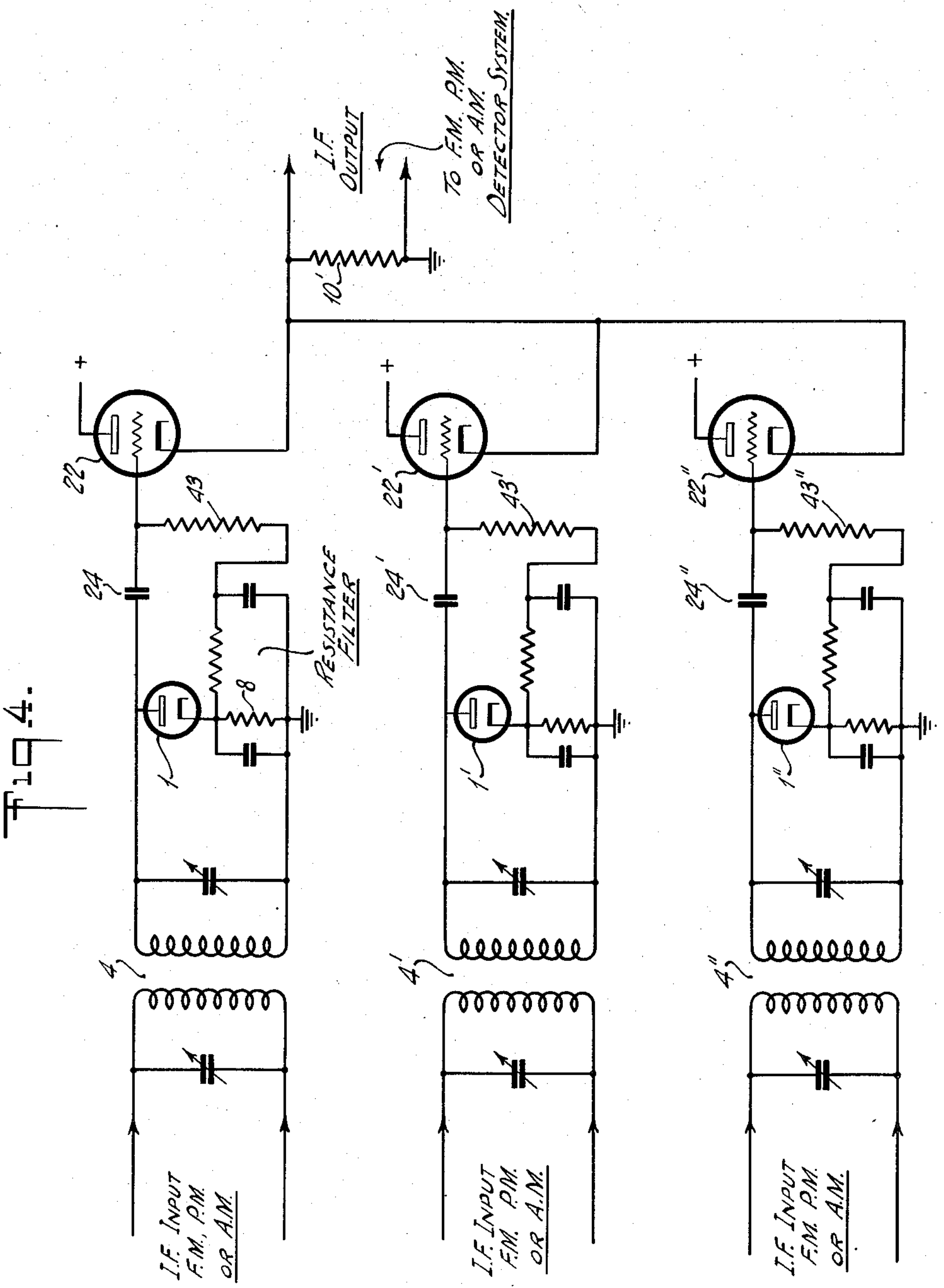

The system of Fig. 4 is somewhat similar to that of Fig. 2, except that use is made in Fig. 4 of the so-called infinite impedance diode (three-element vacuum tube).

Figure 5:
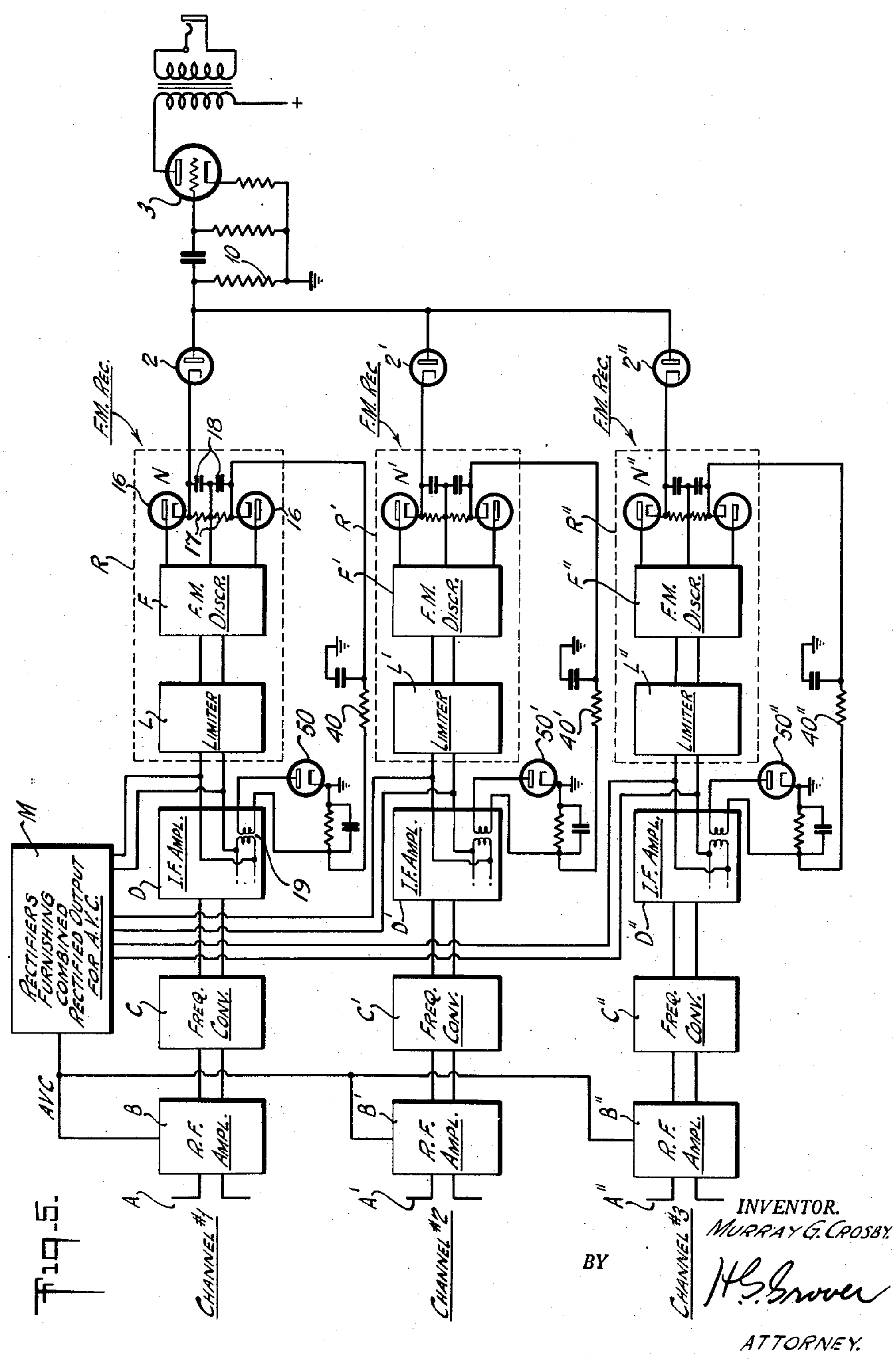

Fig. 5 is a modification of Fig. 1 utilizing differential diode resistors in circuit with the outputs of the frequency modulation receivers.

Throughout the figures of the drawings, the same parts are represented by the same reference characters.

The system of Fig. 1 shows three similar receivers designated "Channel #1," "Channel #2," and "Channel #3." Since the apparatus at the three receivers are similar, and similarly arranged, the units of the second and third receivers have been given the same reference numerals as the first receiver with the addition of prime designations. The operation of all three receivers is the same. Each receiver includes an antenna A, A′ or A″, a radio frequency amplifier B, B′ or B″, a frequency converter C, C′ or C″, and an intermediate frequency amplifier D, D′ or D″. Each receiver may have its own local beating oscillator (not shown) connected to the frequency converter or, if desired, there may be used a common beating oscillator for all three receivers. The output circuits of the intermediate frequency amplifiers feed into receivers R, R′ and R″. These receivers may be frequency modulation or phase modulation apparatus with or without a limiter, or an amplitude modulation type of receiver, as designated in the drawing. The outputs from the receivers R, R′ and R″ are audio signals which are passed on to the primary winding of audio transformers 5, 5′ and 5″. The secondary winding of audio transformers 5, 5′, 5″ are coupled to the cathodes of diodes 2, 2′, 2″ whose anodes are directly connected together in electrically parallel relation by means of lead 12.

A portion of the outputs of the intermediate frequency amplifiers D, D′, D″ is passed through transformers 4, 4′ and 4″ to rectifiers 1, 1′ and 1″, which rectify the intermediate frequency signal. Rectifier 1 is provided with a low pass filter 6, 7 and 9, and a resistor 8 from which direct current bias is available proportional to the individual signal strength in the output of its associated channel. Rectifiers 1' and 1'' are each provided with similar low pass filters and associated resistors having corresponding reference numerals with prime designations. Low pass filter 6, 7, 9 is designed to remove the amplitude modulation component of the noise detected by diode 1. It is essential that this noise be removed to prevent the amplitude modulation noise from appearing in output resistor 10 and thereby impairing the signal-to-noise ratio of the signal from resistor 10. The direct current biases from the resistors across the rectifiers 1, 1', 1'' are respectively supplied to one terminal of their associated audio transformers 5, 5' or 5'' and cause their associated diodes 2, 2' or 2'' to draw current so that these diodes act as resistances which will pass the audio output signal from the receivers R, R', or R'' through the transformers 5, 5' or 5''. An unbypassed output resistor 10 is provided in common to all three diodes 2, 2', 2'' so that if the bias fed to one of the diodes (for example diode 2) is stronger than that fed to any of the other diodes 2' or 2'', the voltage built up on resistor 10 will bias the other diodes 2' or 2'' receiving the weaker signals so that they (2', 2'') will not draw current and therefore will not pass the signals from transformers 5', 5''. It will thus be seen that the diodes 2, 2' and 2'' merely act as gates and do not rectify.

The system of Fig. 1 is so designed that the weaker signals in the different channels are switched off or prevented from contributing to the useful output, whereas the stronger signal in any one channel is permitted to contribute the entire useful output. A vacuum tube amplifier 3 serves to amplify the audio signal and to supply the amplified audio signal to an audio transformer 11 whose secondary winding is shown connected to a suitable jack 13. Any desired acoustic device, such as headphones or a loud speaker, or for that matter any audio recording or repeating system can be connected to jack 13.

A group of rectifiers shown in box M and supplied with a common output resistor (not shown) furnishes the AVC (automatic volume control) potential to the radio frequency amplifiers of the different channels over the AVC lead. The inputs to the rectifiers in box M are connected to the outputs of the different intermediate frequency amplifiers D, D', D'' as shown in the drawing. It has been found that the system of Fig. 1 is highly advantageous when the receiver R, R' or R'' is a frequency modulation or phase modulation receiver employing a limiter. Such an arrangement is described hereinafter in more detail in connection with Fig. 5. I have found that the maximum sensitivity of control is obtained in the system of Fig. 1 when the alternating current voltages at transformers 5, 5', 5'' from the outputs of the receivers R, R', R'' is relatively small. As an example, in one experimental embodiment tried out in practice, the control from one channel to the other shifted completely when the relative biases from the diodes 1, 1', 1'' changed one volt.

Although it might appear that distortion would be caused when one signal in one channel is slightly stronger than a signal in onother channel, so that the stronger signal output is contributing a full wave while the weaker signal is contributing a partially rectified wave, this effect, however, does not appear. In other words, distortionless reception is achieved.

It should be noted that I have been able to separate the direct current controlling bias from the voltages to be combined, and that I have provided an audio frequency output directly from the receiver under control of the intermediate frequency rectified signal. The system of the invention thus allows a reduction in the level of the voltages to be combined with a consequent improvement in the sensitivity of the selecting action between the stronger and weaker signals. At this time I wish to point out that in the system of my copending case now U. S. Patent 2,420,868 I provide a positive polarizing potential over the common resistor in the outputs of the diodes whereas no such polarizing potential is provided herein. This is because the system of the present invention requires less audio frequency current passing through the transformers 5, 5' and 5'' than is present in the outputs of the diodes in my U. S. Patent 2,420,868. This smaller magnitude of audio voltage in the present invention does not allow a modulation of the current to a depth sufficient to cause the negative peak clipping which is produced by the higher audio voltages.

Fig. 2 is a modification of the system of Fig. 1 and illustrates a method by which the intermediate frequency outputs of the different channels can be combined for utilization from a common output resistor 10'. In the circuit of Fig. 2, the transformers 4 supply energy to the rectifiers 1, 1', 1'' and also combining diodes 2, 2', 2''. Considering channel #1, for example, the rectified signal from resistsor 8 is fed through low pass filter 6, 7, 9 and biases diode 2 through choke coil 25. The intermediate frequency signal from transformer 4 is passed through condenser 24 and also appears on diode 2. The value of condenser 24 is adjusted in order to feed the desired amount of intermediate frequency to the diode 2. The choke coil 25 allows the intermediate frequency energy passing through condenser 24 to pass to rectifier 2 and conducts the bias voltage from resistor 8 to diode 2. It will thus be seen that I have been able (in Fig. 2) to separate the intermediate frequency energy from the direct current bias and pass them over separate paths (24 and 25) in order to superimpose them on one another at the diode 2 at a reduced level of intermediate frequency current. The operation of the system of Fig. 2 is generally like that of Fig. 1, keeping in mind the foregoing modification.

In experiments tried out in connection with a system like that shown in Fig. 2, I have found that with about 0.085 R. M. S. volts fed from condenser 24 to the combining diodes 2, 2', 2'', the control from one channel to another switched completely from one diode 2 to another diode 2' or 2'' with a change of merely 0.5 volts plus or minus on one of the diode biases caused by a change in the intermediate frequency signal. Hence, if the rectified signal from resistor 8 were 10 volts, the change in signal to effect the switch over from one channel to another would be 5% or plus or minus 0.5 db. If the rectified signal were 20 volts (a likely value) the switch over from one channel to another would be effected by a plus or minus 0.25 db. change in one radio frequency signal with respect to the other one.

Fig. 3 shows one form of the invention useful for receiving phase or frequency modulated signals. The circuit of this figure is highly desirable for preventing a bucking or cancelling condition in the outputs of the receivers normally brought about by an equality of signals of opposite phases in two or more channels. I have noticed that for the 180° out-of-phase condition for incoming signals, the wave-form is that of a second harmonic in the combiner output. By taking the second harmonic from the combiner output and adding it to the fundamental output in a diversity receiving combination, I am able to prevent cancellation for the signal bucking condition. Fig. 3 shows only that portion of the system which appears to the right of diode combiners 2, 2′ and 2″. The circuit to the left of the diodes 2, 2′, 2″ may take the form shown in that portion of Fig. 2 appearing to the left of diodes 2, 2′, 2″ in this last figure. It should be noted that the intermediate frequency output appearing across the common resistor 10′ is fed over two paths 31, 32, 33 and 34; and 35, 36, 37 and 38. One circuit 31, 32 is tuned to the fundamental frequency of the intermediate frequency energy appearing across resistor 10′, while the other circuit 35, 36 is tuned to the second harmonic of the intermediate frequency energy and for twice the frequency or phase deviation of the fundamental. The two outputs from the differential diode circuits 33, 34 and 37, 38 are added in series to give a total audio output available for utilization in audio amplifier 3.

Fig. 4 shows another embodiment of the invention somewhat similar to Fig. 2, wherein use is made of the so-called infinite impedance electron discharge devices 22, 22′ and 22″ (three element vacuum tube). This type of infinite impedance device has the advantage that its input does not draw current, as a result of which a resistance filter may be used in place of the inductance type shown in Fig. 2, and a resistor 43 in Fig. 4 may replace the choke coil 25 in Fig. 2. The resistance filter in Fig. 4 has the advantage of being simpler and more compact than the inductance filter of Fig. 2, but it is also so designed that its cut-off frequency is below the minimum modulation frequency at the receiver output. The type of circuit shown in Fig. 4 requires a positive control bias from the diode 1, 1′, and 1″ so that the resistor 8 is connected in the cathode circuit in the biasing diode 1, 1′, 1″ relative to ground instead of in the anode circuit as in Fig. 1. Intermediate frequency energy, which may be either frequency, phase or amplitude modulated, is supplied to the transformers 4, 4′ and 4″ in the same manner as in Fig. 2. An intermediate frequency output is available in the common resistor 10′ which is connected between ground and the cathodes of the infinite impedance diodes 22, 22′, 22″, as shown. The intermediate frequency output across resistor 10′ may be fed to either a frequency or phase or amplitude detector system, depending upon the type of modulated wave received by the system.

Fig. 5 shows a modification of the system of Fig. 1, particularly adapted for combining the outputs of frequency modulation telegraph receivers in the different channels. Generally stated, the transformers 5, 5′ and 5″ in Fig. 1 are replaced in Fig. 5 by differential diode resistors in circuit with the outputs of the frequency modulation receivers. Fig. 5 provides a very simple means of combining the detected outputs of the frequency modulation receivers in which separate limiters are inserted before the combination. More specifically, Fig. 5 comprises three channels similar to Fig. 1, in which the receivers R, R′ and R″ are frequency modulation receivers, each including a limiter L, L′ or L″, a frequency modulation discriminator F, F′ or F″ and a differential diode resistor circuit N, N′ or N″. The differential diode resistors N, N′ and N″ each comprise a pair of diodes 16, 16 whose anodes are coupled to the output of the associated frequency modulation receiver and whose cathodes are connected together through equal value resistors 17, as shown. These resistors 17 are shunted by suitable by-pass condensers 18. This type of differential diode resistor N, N′ or N″ is sometimes known as a balanced diode circuit and is well known in the art, no claim being made to it per se. Each channel is provided with a rectifier 50, 50′, 50″ which is fed by the incoming frequency input to the signal through a transformer 19 at the input of the limiter. The signal rectified by the diode 50, 50′, and 50″ is fed to the cathode of one of the diodes 16, 16 of the associated differential diode circuits in such manner that the discriminator and its differential diode circuit is floating at a bias potential determined by the rectifier 50, 50′, or 50″. Automatic volume control for the three channels over an AVC lead is obtained from a common resistor (not shown) in circuit with the combined rectified outputs of the radio frequency amplifiers supplied by apparatus M, in the same manner as in Fig. 1.

In the operation of the system of Fig. 5, let us assume that the signal to channel 1 is the strongest of the signals received on the antennas A, A′ and A″. The rectified signal from rectifier 50 will be fed to the diode 2 and will cause diode 2 to act as a resistance and pass the detected signals from the differential diode circuit N. At the same time, the voltage from rectifier 50 is in series with the diode 2 and appears on the conductor output resistor 10, and since this signal is greater than that obtained from either of the other rectifiers 50′, 50″, it will be evident that the diodes 2′ and 2″ are biased so that they do not draw current and are therefore an open circuit insofar as the passage of signals from the differential diode circuits N′ and N″ are concerned. Hence, a selector action is effected whereby the strongest signal in one of the three channels biases its respective output diode 2, 2′ or 2″ to operation and the remaining diodes to inoperation. The result is a selection of the signal having the greatest amplitude at the input of the limiter of the frequency modulation signal regardless of the fact that the limiters hold the detected outputs of the three receivers at the same amplitude.

An advantage of the system of Fig. 5 lies in the elimination of the use of controlled amplifiers of the prior art and the complicated circuits brought about by their use.

It should be noted that the low-pass filters 6, 7 in Figs. 1 and 2, and the resistance filters 40 in Figs. 4 and 5 are so designed that their cut-off frequency is below the minimum modulation frequency at the receiver output. If this is not done, the high signal-to-noise ratio obtained by the use of frequency modulation is impaired. This is especially true if the frequency modulation output level is low compared to the control voltage.

What is claimed is:

1. In a diversity receiving system having a plurality of receiver channels feeding a common utilization circuit, means for passing to said utilization circuit the signal from only that receiver channel having the largest incoming voltage, said means including a rectifier and an electron discharge device resistor in each receiver channel, and connections for feeding both said rectifier and said electron discharge device resistor over separate paths with alternating current, and a connection from the output of said rectifier to said electron discharge device resistor, whereby said rectifier serves to rectify the alternating current in said channel and said electron discharge device resistor passes the rectified current from said rectifier, and a common load resistor for all of the discharge device resistors of said channels, whereby the passage of current through any one of said discharge device resistors produces a direct component of voltage drop in said load resistor which appears as a negative bias on the other discharge device resistors, as a result of which the alternating current signal energy passed on to said utilization circuit is controlled by the rectified alternating current and the controlling bias is separated from the voltages to be combined.

2. In a diversity receiving system having a plurality of receivers feeding a common utilization circuit, a rectifier in circuit with each receiver for rectifying the alternating current signal in each receiver, a tube for each receiver for passing the rectified current therefrom, a separate path in each receiver for passing the alternating current signal to the same tube which passes the rectified alternating current, a common load resistor for said tubes connected thereto by a direct current connection, whereby the passage of current through any one tube produces a component of voltage drop in said load resistor which appears as a negative bias on the other tubes.

3. A diversity receiving system comprising a plurality of receiver channels each of which includes a receiver for producing an audio frequency signal, a rectifier coupled to each receiver for rectifying the alternating current signal of higher than audio frequency, a tube for each channel in circuit with the output of the rectifier of that channel and adapted to pass the rectified current thereof, a common direct current impedance element connected to the outputs of said tubes of all of said channels, and means also in circuit with the tube in each channel for supplying thereto the audio frequency signal, whereby the rectified alternating current and the audio frequency signal flow through separate paths in each channel to said tube, and the audio frequency signal passed by said tube is controlled by the rectified alternating current.

4. A diversity receiving system comprising a plurality of spaced antennas, individual superheterodyne receivers for said antennas, each receiver including an intermediate frequency amplifier and a rectifier following said amplifier, said rectifier deriving energy from the output of said intermediate frequency amplifier, a tube coupled to the output of the rectifier of each receiver, a common direct current impedance coupled to the outputs of said tubes, whereby the flow of current through any one of said tubes causes a direct current to flow through said common impedance and produces a negative bias on the other tubes in circuit with the other receivers, and an alternating current connection between the output of the intermediate frequency amplifier in each receiver and said tube in circuit with the same receiver.

5. A diversity receiving system comprising a plurality of superheterodyne receiver channels each of which includes a rectifier for rectifying the alternating current signal output thereof, diodes respectively in circuit with the rectifiers of said different receiver channels and adapted to pass the rectified currents of the different receiver channels, a common load for said diodes, and means for supplying the diode in each channel with unrectified alternating current signal energy in said same channel.

6. In a diversity receiving system having a plurality of receiver channels feeding a common utilization circuit, each of said receiver channels including a radio frequency amplifier, a frequency converter, an intermediate frequency amplifier and a rectifier for rectifying the output of said intermediate frequency amplifier, said rectifier including a cathode connected directly to ground, a low pass filter shunted by a resistor in the space current path of said rectifier, said filter being located between the cathode and another electrode of said rectifier, a diode for the output of each rectifier and having a cathode coupled over a path capable of passing direct current to that terminal of said resistor which is farthest away from the cathode of said rectifier, means for directly connecting together the anodes of the diodes associated with the different receiver channels, a common load resistor having one terminal directly connected to the anodes of said diodes and another terminal connected to ground, and a path for supplying the diode in each channel with unrectified intermediate frequency energy in said same channel.

7. A receiving system for angular velocity waves, comprising in the order named a radio frequency amplifier, a frequency converter, an intermediate frequency amplifier, a limiter coupled to the output of said last amplifier, a discriminator following said limiter, and a differential type detector for rectifying the output of said discriminator, said differential type detector including a pair of tubes having their cathodes connected together, an electron discharge device type of resistor coupled to the output of said differential type detector, a load resistor connected to the output of said electron discharge device resistor, a rectifier coupled to the output of said intermediate frequency amplifier, a direct current connection between the output of said rectifier and the cathode of one tube of said differential type detector for biasing said detector at a bias potential determined by said rectifier, and a utilization circuit coupled to said load resistor.

8. A receiving system for angular velocity waves, comprising in the order named a radio frequency amplifier, a frequency converter, an intermediate frequency amplifier, a limiter coupled to the output of said last amplifier, a discriminator following said limiter, and a differential type detector for rectifying the output of said discriminator, said differential type detector including a pair of tubes having their cathodes connected together, a diode having its cathode connected through a connection capable of passing direct current to the cathode of one tube of said differential type detector, a load resistor having one terminal connected to the anode of said diode and its other terminal connected to a point of fixed radio frequency potential, and a rectifier coupled to the output of said intermediate frequency amplifier and having its output coupled to the cathode of the other tube of said detector for supplying the cathode of the other tube of said detector with a bias potential determined by the magnitude of signal rectified by said rectifier.

9. A diversity system in accordance with claim 2, including a pair of signal paths having their inputs coupled in parallel relation and connected to said common load resistor, one of said signal paths including a limiter and a discriminator both tuned to the fundamental of the intermediate frequency energy appearing across said common load resistor, the other of said signal paths including a limiter and a discriminator both tuned to the second harmonic of the intermediate frequency energy and being adjusted for twice the frequency or phase deviation of said fundamental, and a connection adding in series the outputs from said discriminators.

10. In a diversity receiving system for receiving frequency modulated waves, a plurality of receiving channels feeding a common utilization circuit, each of said channels including a radio frequency amplifier, a frequency converter, an intermediate frequency amplifier, a limiter following said intermediate frequency amplifier, a frequency modulation discriminator in the output of said limiter, a differential diode circuit in the output of said discriminator, and a vacuum tube resistor coupled to said differential diode circuit, a rectifier coupled between the output of said intermediate frequency amplifier and said differential diode circuit for rectifying the intermediate frequency signal and for applying the resultant rectified voltage as a direct current bias to said diode circuit, whereby said discriminator and associated differential diode circuit operates at a varying bias voltage determined by the magnitude of the rectified intermediate frequency signal, a connection coupling the outputs of said vacuum tube resistors in electrically parallel relation, and a common load resistor connected to said connection, whereby the passage of current through said common load resistor due to the flow of rectified current in one channel produces a negative bias on the other vacuum tube resistors.

11. In a diversity receiving system for receiving frequency or phase modulated waves, a plurality of receiving channels, coupled to different energy pick-ups each channel feeding a common utilization circuit, each of said channels including a radio frequency amplifier, a frequency converter, an intermediate frequency amplifier, and a frequency or phase modulation detector following said last amplifier, a vacuum tube resistor coupled to the output of said detector, a rectifier coupled to the output of said intermediate frequency amplifier and having its output coupled to said vacuum tube resistor for rectifying the intermediate frequency signal and for applying the resultant rectified voltage on the detected intermediate frequency signal voltage supplied by said detector to said vacuum tube resistor, a low pass filter in said rectifier, connections coupling the outputs of said vacuum tube resistors in said plurality of channels in electrically parallel relation for direct current, and a common load resistor for the outputs of said vacuum tube resistors.

12. In a diversity receiving system having a plurality of receiver channels feeding a common utilization circuit, means for passing to said utilization circuit the signal from only that receiver channel having the largest incoming voltage, said means including a first rectifier in each receiver channel for rectifying the alternating current in that channel, and also including an electron discharge device resistor for passing the rectified current from the first rectifier, and an unbypassed common load resistor for all of the discharge device resistors of said channels, whereby the passage of current through any one of said discharge device resistors produces a direct component of voltage drop in said load resistor which appears as a negative bias on the other discharge device resistors, and a path in each receiver channel for supplying its associated discharge device resistor with alternating current signal energy, as a result of which the alternating current signal energy passed on to said utilization circuit is controlled by the rectified alternating current.

13. A diversity receiving system comprising a plurality of spaced antennas, individual superheterodyne receivers for said antennas, each receiver including an intermediate frequency amplifier and a rectifier following said amplifier, said rectifier deriving energy from the output of said intermediate frequency amplifier, a tube coupled to the output of the rectifier of each receiver, a common direct current impedance coupled to the outputs of said tubes, whereby the flow of current through any one of said tubes causes a direct current to flow through said common impedance and produces a negative bias on the other tubes in circuit with the other receivers, and a path in circuit with each receiver for supplying the said tube associated therewith with alternating current signal energy which bypasses the rectifier for that receiver.

14. A diversity receiving system as defined in claim 6, including a pair of signal paths having their inputs coupled in parallel relation and connected to said common load resistor, one of said signal paths including a limiter and a discriminator both tuned to the fundamental of the intermediate frequency energy appearing across said common load resistor, the other of said signal paths including a limiter and a discriminator both tuned to the second harmonic of the intermediate frequency energy and being adjusted for twice the frequency or phase deviation of said fundamental, and a connection adding in series the outputs from said discriminators.

MURRAY G. CROSBY.

REFERENCES CITED

The following references are of record in the file of this patent:

UNITED STATES PATENTS

| Number | Name | Date |
|---|---|---|
| 2,153,780 | Van Loon | Apr. 11, 1939 |
| 2,253,338 | Lewis | Aug. 19, 1941 |
| 2,261,643 | Brown | Nov. 4, 1941 |
| 2,282,526 | Moore | May 12, 1942 |
| 2,290,992 | Peterson | July 28, 1942 |
| 2,349,407 | Crosby | May 23, 1944 |
| 2,364,952 | Crosby | Dec. 12, 1944 |
| 2,420,868 | Crosby | May 20, 1947 |